(12) United States Patent
Gillespie et al.

(10) Patent No.: US 11,105,434 B2
(45) Date of Patent: *Aug. 31, 2021

(54) FLOW RIB IN VALVES

(71) Applicant: Automatic Switch Company, Florham Park, NJ (US)

(72) Inventors: Brian Gillespie, Bridgewater, NJ (US); David Park, Madison, NJ (US); Gregory Volz, Pequannock, NJ (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,105

(22) Filed: Nov. 16, 2017

(65) Prior Publication Data

US 2018/0087672 A1 Mar. 29, 2018

Related U.S. Application Data

(63) Continuation of application No. 14/473,353, filed on Aug. 29, 2014, now Pat. No. 9,822,885.

(51) Int. Cl.
*F16K 27/02* (2006.01)
*F16K 47/08* (2006.01)
*F16K 1/52* (2006.01)

(52) U.S. Cl.
CPC ............ *F16K 27/02* (2013.01); *F16K 1/52* (2013.01); *F16K 47/08* (2013.01); *Y10T 137/87539* (2015.04)

(58) Field of Classification Search
CPC ..... Y10T 137/87507; Y10T 137/87539; F16K 27/02; F16K 27/0236; F16K 47/08

USPC ........................................................ 251/118
See application file for complete search history.

(56) References Cited

U.S. PATENT DOCUMENTS

| | | | |
|---|---|---|---|
| 2,216,092 A | 9/1940 | Northon | |
| 2,240,904 A | 5/1941 | Groeniger | |
| 2,524,009 A | 9/1950 | Dopp et al. | |
| 2,621,016 A | 12/1952 | Macgregor | |
| 2,877,791 A * | 3/1959 | Rich | F16K 7/17 |
| | | | 137/188 |
| 3,038,494 A | 6/1962 | Gulick | |
| 3,054,533 A | 9/1962 | Kurek | |
| 3,295,822 A | 1/1967 | Bannon, Jr. et al. | |
| 3,396,742 A | 8/1968 | Beck | |
| 3,524,470 A | 8/1970 | Kah, Jr. et al. | |
| 3,650,289 A | 3/1972 | Locke | |

(Continued)

FOREIGN PATENT DOCUMENTS

WO 2013152993 10/2013

*Primary Examiner* — Seth W. Mackay-Smith
(74) *Attorney, Agent, or Firm* — Mackey Law Firm PLLC

(57) ABSTRACT

A valve can include a rib for improving flow, which can include improving a flow rating of the valve and improving the structural integrity of the valve. A valve can include a valve body, one or more inlets for allowing flow into the body, one or more outlets for allowing flow out of the body, one or more flow paths, and one or more ribs for routing fluid in a flow path. A valve can include an orifice fluidically between an inlet and an outlet and one or more ribs disposed upstream and/or downstream of the orifice. A valve can include one or more ribs in an inlet flow path, an outlet flow path or another flow path and a rib can be coupled between two or more portions of a valve.

20 Claims, 12 Drawing Sheets

(56) References Cited

U.S. PATENT DOCUMENTS

| | | | |
|---|---|---|---|
| 3,672,627 A | 6/1972 | McCarty, Jr. et al. |
| 4,065,095 A | 12/1977 | Johnson |
| 4,096,879 A | 6/1978 | Serur et al. |
| 4,114,642 A | 9/1978 | Robbins |
| 4,215,717 A | 8/1980 | Trosch |
| 4,244,556 A | 1/1981 | Miller |
| 4,301,836 A | 11/1981 | Hunziker |
| 4,397,331 A * | 8/1983 | Medlar .................. F16K 47/02 137/375 |
| 4,398,561 A | 8/1983 | Maldavs |
| 4,500,067 A | 2/1985 | Zukausky |
| 4,506,860 A | 3/1985 | von Schwerdtner et al. |
| 4,651,971 A | 3/1987 | Donahue, Jr. |
| 4,781,217 A | 11/1988 | Rosenberg |
| 4,821,768 A | 4/1989 | Lett |
| 4,832,311 A | 5/1989 | Kimura |
| 4,949,750 A * | 8/1990 | Goodwin ............ F16K 17/0453 137/493.8 |
| 4,966,199 A | 10/1990 | Ruschke |
| 5,301,707 A | 4/1994 | Hofsteenge |
| 5,363,873 A | 11/1994 | Richmond |
| 5,397,098 A | 3/1995 | Schreiner |
| 5,593,292 A | 1/1997 | Ivey |
| 5,620,027 A | 4/1997 | Sato |
| 5,645,264 A * | 7/1997 | Kah, Jr. .................. F16K 7/126 251/118 |
| 5,782,455 A | 7/1998 | Burnworth |
| 5,896,884 A | 4/1999 | Hettinger |
| 5,915,416 A | 6/1999 | Okazaki et al. |
| 5,996,619 A | 12/1999 | Saur et al. |
| 6,065,447 A | 5/2000 | Saeki et al. |
| 6,220,272 B1 | 4/2001 | Tavor |
| 6,668,857 B2 | 12/2003 | Gagnon et al. |
| 6,691,702 B2 | 2/2004 | Appel et al. |
| 6,877,523 B2 | 4/2005 | Dempsey et al. |
| 6,913,042 B2 | 7/2005 | Tran |
| 7,055,547 B2 | 6/2006 | Wang |
| 7,143,992 B2 | 12/2006 | Sassone et al. |
| 7,404,538 B2 | 7/2008 | Gill et al. |
| 7,448,408 B2 | 11/2008 | Yumoto |
| 7,744,061 B2 | 6/2010 | Isogai et al. |
| 7,815,169 B2 | 10/2010 | Arosio |
| 7,832,425 B2 | 11/2010 | Wears et al. |
| 8,082,951 B2 | 12/2011 | Arsin |
| 8,091,864 B2 | 1/2012 | Smith |
| 8,105,529 B1 | 1/2012 | Hendry |
| 8,122,908 B2 | 2/2012 | Wears et al. |
| 8,181,670 B2 | 5/2012 | Russberg |
| 8,220,496 B2 | 7/2012 | Marica |
| 8,286,658 B2 | 10/2012 | Devall |
| 8,397,742 B2 | 3/2013 | Thrash et al. |
| 8,465,132 B2 | 6/2013 | Katoh et al. |
| 8,479,771 B2 | 7/2013 | Campbell et al. |
| 8,534,321 B2 | 9/2013 | Ziv et al. |
| 8,973,600 B2 * | 3/2015 | Esveldt ...................... F16K 1/12 137/219 |
| 9,046,191 B2 * | 6/2015 | Davies ................... F16K 47/00 |
| 9,822,885 B2 | 11/2017 | Gillespie et al. |
| 2005/0229982 A1 | 10/2005 | Gonzales |
| 2006/0134495 A1 | 6/2006 | Gallagher et al. |
| 2007/0164243 A1 | 7/2007 | Volz |
| 2010/0083929 A1 | 4/2010 | Sakagami et al. |
| 2010/0163651 A1 | 7/2010 | Feith et al. |
| 2012/0061595 A1 | 3/2012 | Canjuga |
| 2012/0267554 A1 | 10/2012 | Heyer et al. |
| 2013/0008529 A1 * | 1/2013 | Becker ................ G05D 7/0133 137/501 |
| 2013/0087222 A1 | 4/2013 | Fujiki et al. |
| 2013/0105009 A1 | 5/2013 | Oda |
| 2014/0264104 A1 * | 9/2014 | Ringer .................... F16K 7/126 251/61.2 |

\* cited by examiner

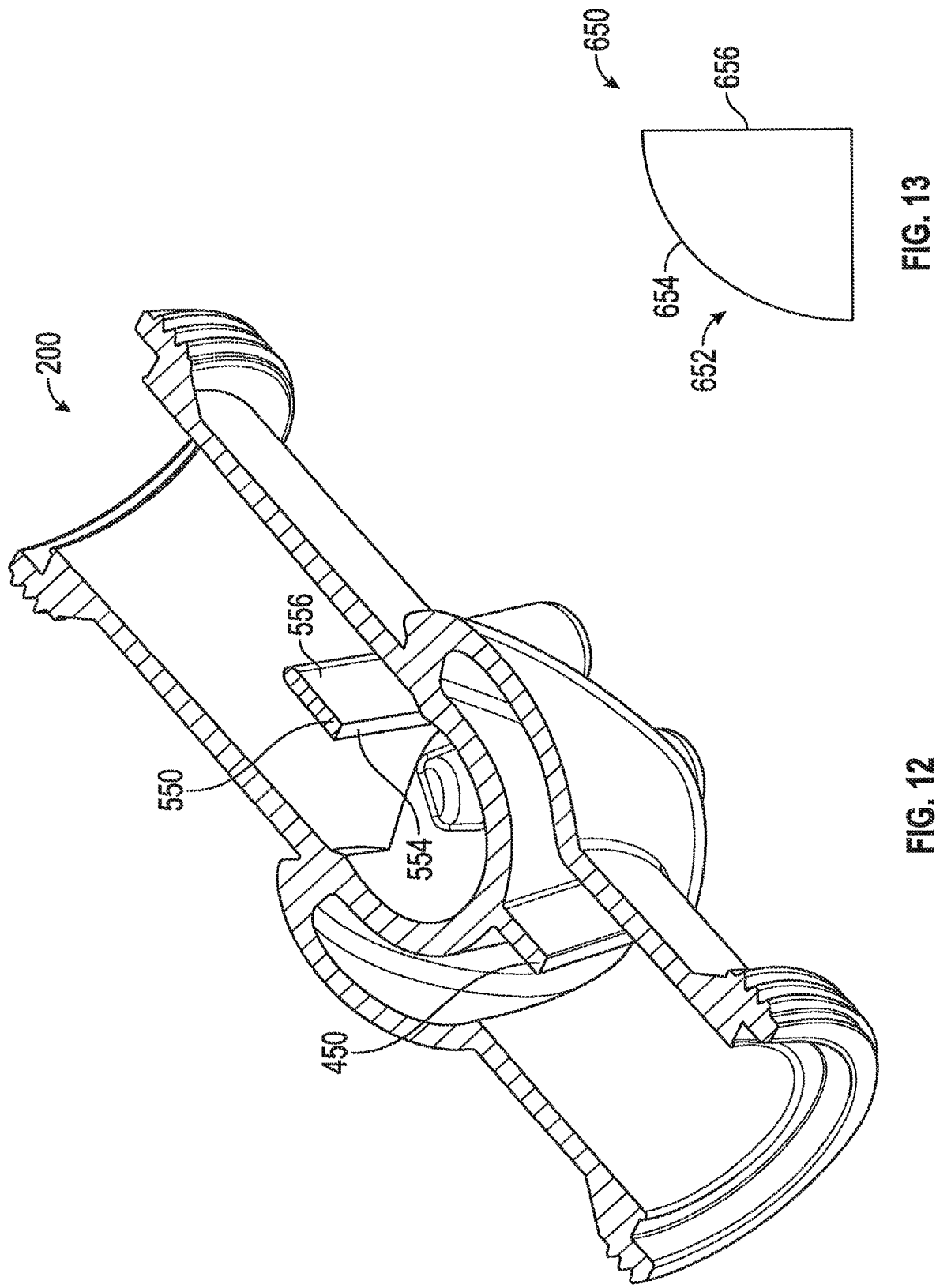

FLOW RIB IN VALVES

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to improving fluid flow through valves.

Description of the Related Art

Various types of valves are known in the art, at least some of which can have a flow rating (or "flow coefficient") K associated therewith. When fluid flows through a valve or other restrictive device it can lose some energy and a valve's flow rating can be representative of an amount of fluid that passes through the valve over a pressure drop. In other words, the flow rating of a valve can be described as a design coefficient or factor that relates head drop or pressure drop across the valve with a flow rate of fluid in or through the valve. In at least some cases, a valve flow rating (for liquids) can be determined according to the equation:

$$Q = K \times \sqrt{\frac{\Delta P}{Sg}}$$

wherein Q is the flow rate, ΔP is the pressure drop across the valve, Sg is the specific gravity of the fluid flowing through the valve, and K is the flow coefficient (Cv in imperial units; Kv in metric units). K (hereinafter "Cv") can be non-dimensional or with units, which can depend on whether parameters such as diameter or density are considered inside the coefficient or equation.

In general, fluid enters a valve through an inlet, passes through an orifice and exits through an outlet. Ideally, in order to achieve maximum flow a valve would be a straight pipe with a smooth surface and laminar flow; any deviations can cause turbulence or other restrictions to the flow, which can lower an overall flow rating. However, valves are not ideal and have varying geometries (bends, rough surfaces, corners, cross-sectional area differences, etc.) that can restrict fluid flow by causing the flow to become turbulent or slowed, which can make for less than ideal valve structures. Valves and valve components can be made in numerous ways, such as by molding, machining, printing and so forth. For example, some valves or valve parts can be made by injecting material into a mold through what is known as a gate. The material can (or ideally should) flow from the gate and around any object in its path (side pulls, pins, etc.) until the mold is completely filled. Plastic and other types of molded valves can have both thin and thick sections of material. The thickness of the material can depend on the design of the valve as well as the material used to mold the valve. In at least some cases, structural failure can be most likely to occur in relatively thin sections, particularly if material inconsistencies are present. For example, knit lines can be created during a mold process when the material flow from a gate is diverted into two or more flows. The two or more flows can recombine in another section(s) of the mold and can weld together forming what is known as a knit line along the intersection. Knit lines can be inherently weaker than other areas in the material due to the material cooling somewhat before welding together. In composite plastics (plastics with some other filler material), for example, the fibers of the filler material may not align properly at the location of the knit line, which can reduce the strength of the formation at that location relative to other locations without knit lines. It can be desirable for plastic and other valves to perform at relatively high pressures and temperatures. However, at such higher pressures and temperatures, knit lines can become a problem for the structural integrity of a valve.

The disclosures and teachings herein are directed to systems and methods for improving valve structures and fluid flow through valves.

BRIEF SUMMARY OF THE INVENTION

A valve can include a body, one or more inlets for allowing fluid flow into the body, one or more outlets for allowing fluid flow out of the body, one or more flow passages or other fluid paths between the inlet and the outlet and one or more ribs or other structures for routing fluid disposed within a flow passage or other fluid path. A valve can include an orifice or other opening fluidically between an inlet and an outlet. A flow path can include a plurality of flow paths, which can include an inlet flow path and an outlet flow path. A valve can include one or more ribs in an inlet flow path, an outlet flow path, another flow path, or a combination thereof.

A valve can include a valve seat and one or more ribs disposed upstream from the valve seat or downstream from the valve seat, which can include at least one rib disposed upstream from the valve seat and at least one rib disposed downstream from the valve seat. A rib can be disposed in an opening in a valve body, downstream of an opening in a valve body or upstream of an opening in a valve body, in whole or in part, separately or in combination. A valve can include a first rib is disposed in an inlet flow passage and a second rib disposed in an outlet flow passage, or vice versa. An opening in a valve body can be an inlet or an outlet. A valve can include an orifice, which can include an orifice body having an inlet and an outlet. At least a portion of an orifice can form at least a portion of a fluid path. A rib can be coupled to one or more structures forming at least a portion of a fluid path, which can include at least a portion of an orifice.

A valve can include one or more inside surfaces, which can include one or more openings therein or there through. An opening in a valve body can be at least a portion of an inlet, outlet or orifice. A valve can include an inside surface and an inlet can include an opening in the inside surface. One or more ribs can be disposed or otherwise arranged at least partially between the opening in the inside surface of the valve body and one or more other valve structures or components, which can include an outside surface of an orifice body or other structure. A rib can include one or more ends, sides or faces, which can include trailing, leading, top, bottom or other ends, sides and faces. A rib can include a trailing end coupled to a surface of a valve component body and a leading end fluidically upstream of the trailing end. One or more ends of a rib can be disposed in an inlet, outlet or other flow passage.

A valve inlet can include an opening in a valve body and a rib can be disposed at least partially within an inlet flow passage and at least partially between the opening in the valve body and a component or other structure that defines at least a portion of the inlet flow passage. At least a portion of a rib can be separated from an opening in a valve body by a distance, disposed within or through an opening in a valve body, adjacent to an opening in a valve body, or a combination thereof. An orifice can include an orifice body, which can be or include at least a portion of a valve body. A rib can at least partially prevent fluid or other material from contacting at least a portion of an orifice body, valve body or other valve structure or component, such as when fluid is present and flowing in at least a portion of a valve. A rib can have a constant cross-sectional area or can have a cross-sectional area that varies along at least one dimension, separately or in combination, in whole or in part. A valve or portion thereof can be molded, such by injection molding. At least a portion of one or more ribs can be formed integrally with a valve or portion thereof, such as a valve body or other portion. A rib can have a plurality of ends, which can include faces, sides, edges or other ends, and at least a portion of one or more ends can be coupled to a valve or valve portion, such as to a valve body, orifice or other valve structure or component.

A valve can include a plurality of ribs disposed in at least one flow passage, which can include one or more flow paths between an inlet and an outlet of the valve or a portion thereof. A plurality of ribs can include at least one rib disposed fluidically upstream from an orifice or other valve component, such as a structure or opening. A plurality of ribs can include at least one rib disposed fluidically downstream from an orifice or other valve component, such as a structure or opening. One or more of a plurality of ribs can be coupled integrally with at least a portion of a valve body, which can include formation by injection or other molding, in whole or in part, separately or in combination. At least one rib can be coupled to an orifice or other valve portion, which can include being coupled or disposed at least partially within a fluid flow path. A rib can change or otherwise affect one or more flow directions of a fluid or fluid portion, which can include at least partially preventing a sudden change in flow direction around a flow obstruction or along a flow path.

BRIEF DESCRIPTION OF THE SEVERAL VIEWS OF THE DRAWINGS

FIG. 12 is another cross-sectional perspective view of the valve of FIG. 11.

FIG. 13 is a side view of one of many embodiments of a rib having a curved end according to the disclosure.

DETAILED DESCRIPTION

Figure 1:
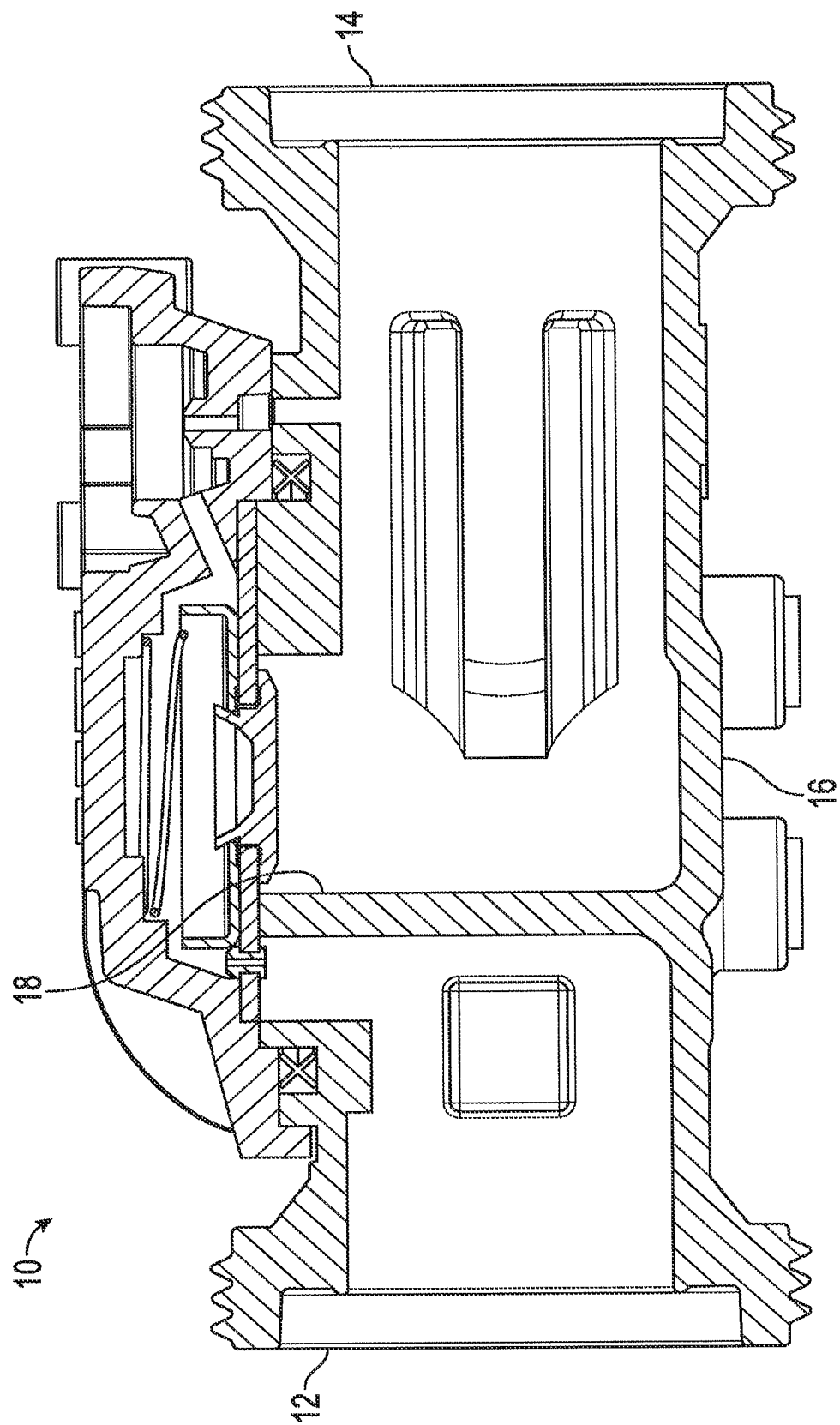
FIG. 1 is a side view of a conventional valve.

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment(s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in the art having the benefits of this disclosure. It must be understood that the embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Figure 2:
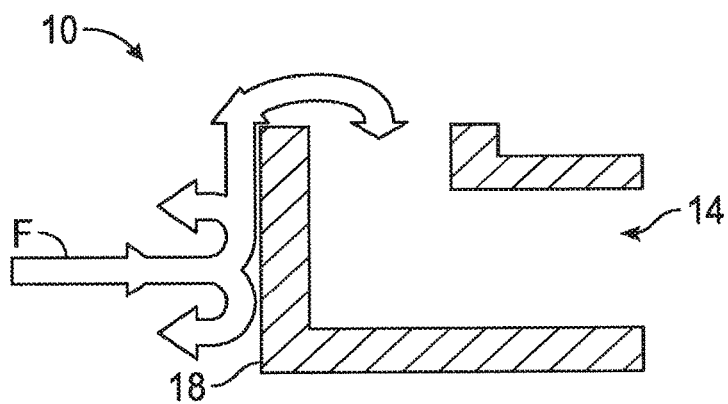
FIG. 2 is a schematic side view of fluid flowing through a portion of the valve of FIG. 1.

FIG. 1 is a side view of a conventional valve. FIG. 2 is a schematic side view of fluid flowing through a portion of the valve of FIG. 1. FIGS. 1 and 2 will be described in conjunction with one another. A conventional valve 10 can include an inlet 12, an outlet 14 and a valve body 16 through which fluid may flow when traveling from the inlet to the outlet. As shown schematically in FIG. 2, as fluid F flows through valve 10, the fluid may encounter one or more obstructions 18, such as a wall or other valve part within body 16, that tend to resist flow through the valve. Other flow obstructions can include turns, corners and other valve structure. Such obstructions can restrict fluid flow by causing the flow to become turbulent or slowed, such as by resisting flow in a frictional manner, causing fluid flow to double back on itself (as shown, for example, by the arrows in FIG. 2), or otherwise changing flow in one or more directions or manners that reduce the overall flow rate through the valve.

Applicants have created systems and methods for improving flow in valves, which can include improving a flow rating associated with a valve and/or improving the structural integrity of a valve. In at least one embodiment, a valve can include one or more ribs disposed in a fluid flow path for routing flow in or through at least a portion of the valve, e.g., in a more efficient manner relative to the valve absent the rib(s), such as by directing the flow of media to take a less resistant path through at least a portion of a flow path through the valve. Improved flow can be achieved by directing flow around or otherwise relative to flow-resistant areas (e.g., turns, corners, obstructions, etc.) and/or directing flow from one section of a valve into a next section of the valve more efficiently. In at least one embodiment, a valve can include one or more ribs for improving the valve structure, which can include strengthening at least a portion of the structure in at least one way, separately or in combination with one another or one or more improved fluid flow characteristics. A system for fluid flow can include a valve having a body, one or more inlets for allowing fluid flow into the body, one or more outlets for allowing fluid flow out of the body, one or more flow paths and one or more ribs or other structures for routing fluid disposed within a flow path, as described in further detail with reference to the Figures.

Figure 3A:
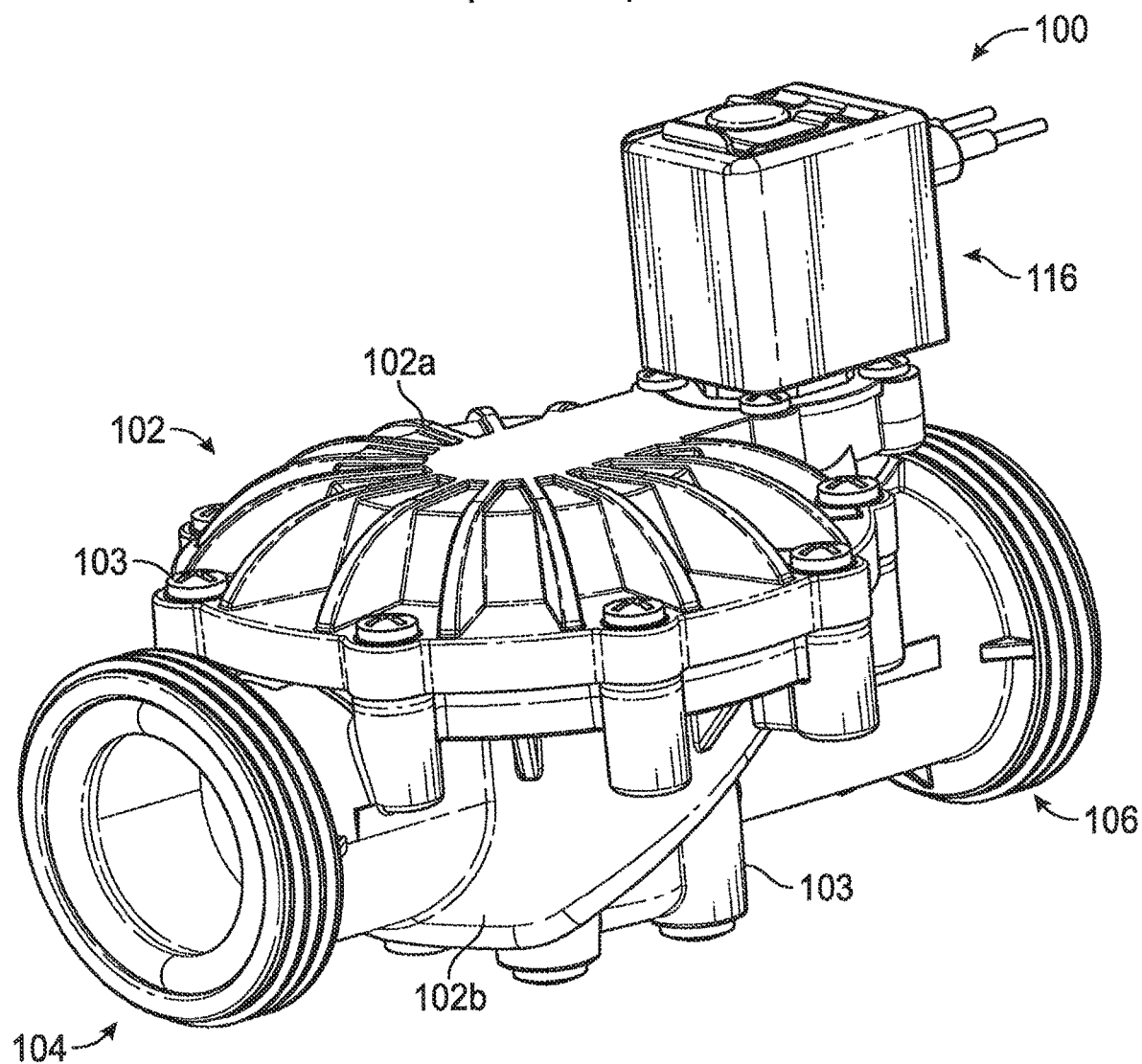
FIG. 3A is a perspective view of one of many embodiments of a valve having a rib according to the disclosure.
Figure 3B:
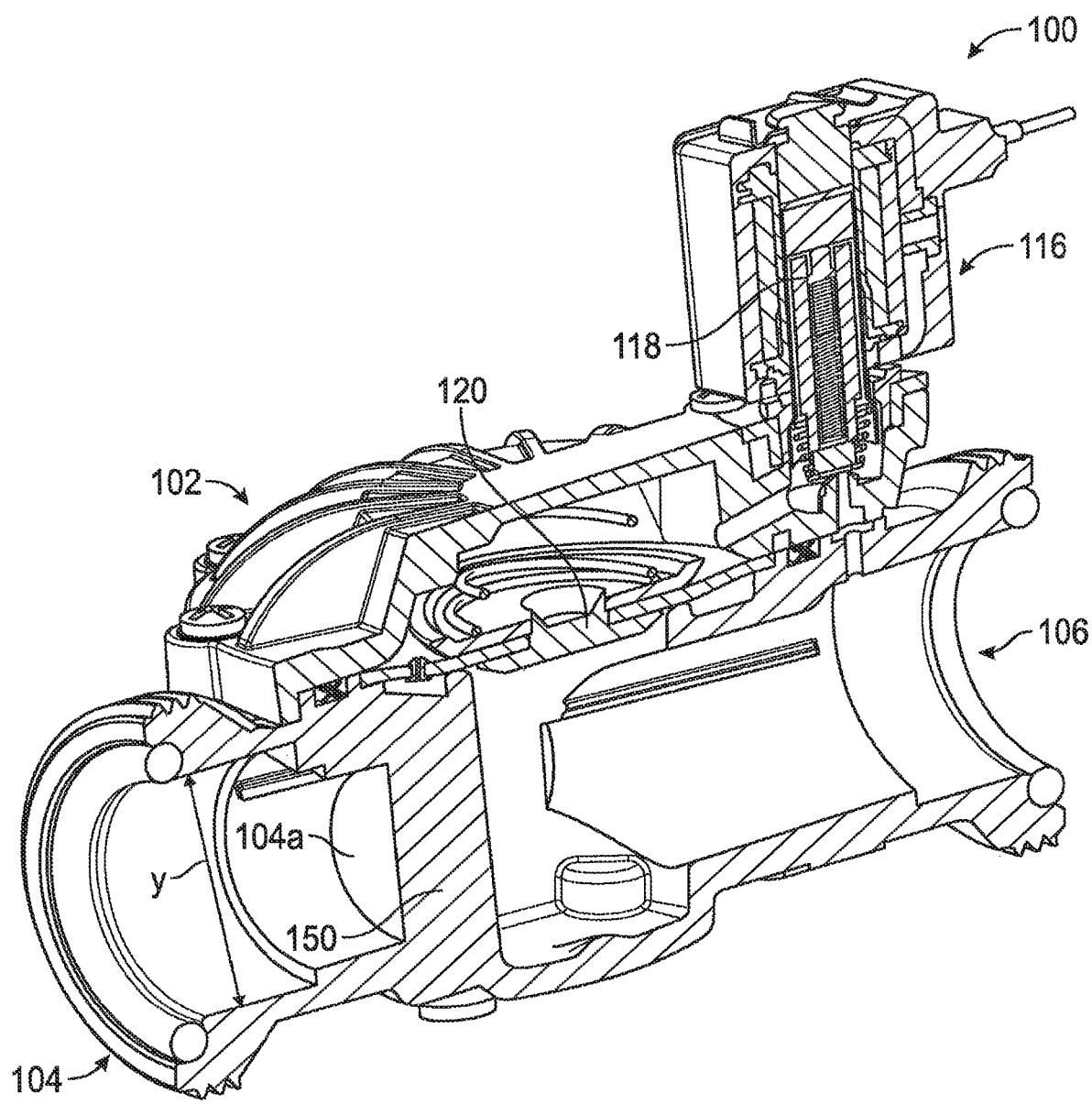
FIG. 3B is a cross-sectional perspective view of the valve of FIG. 3A.
Figure 4:
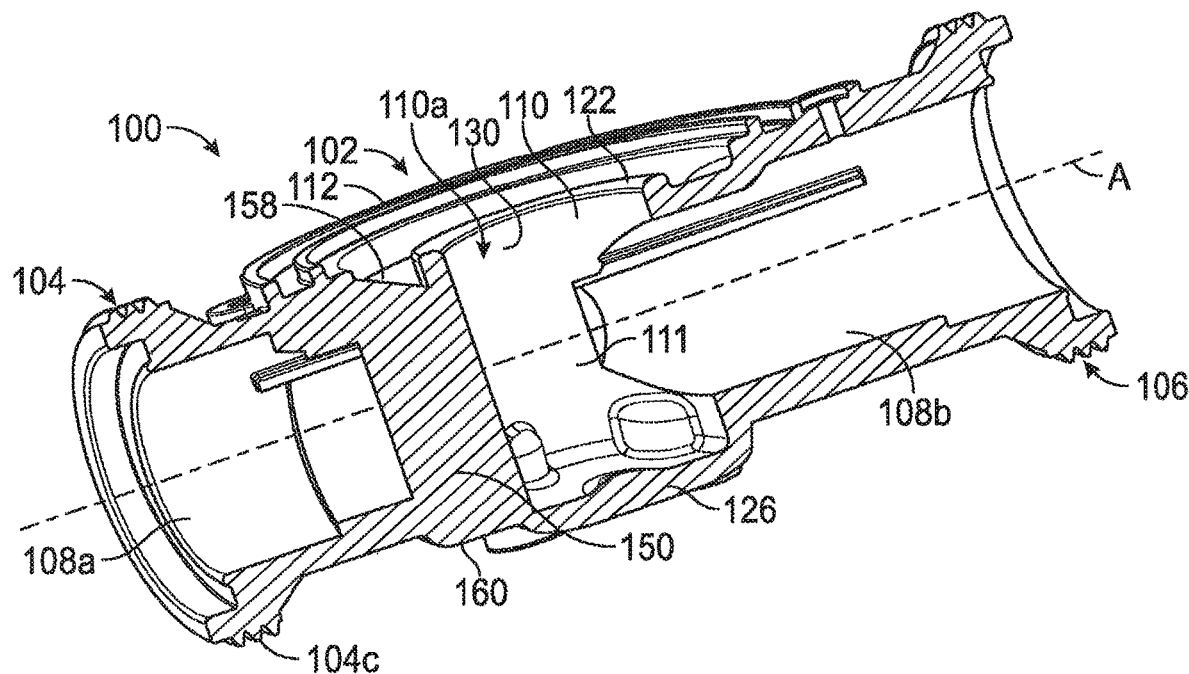
FIG. 4 is a cross-sectional perspective view of the valve of FIGS. 3A-3B.
Figure 5:
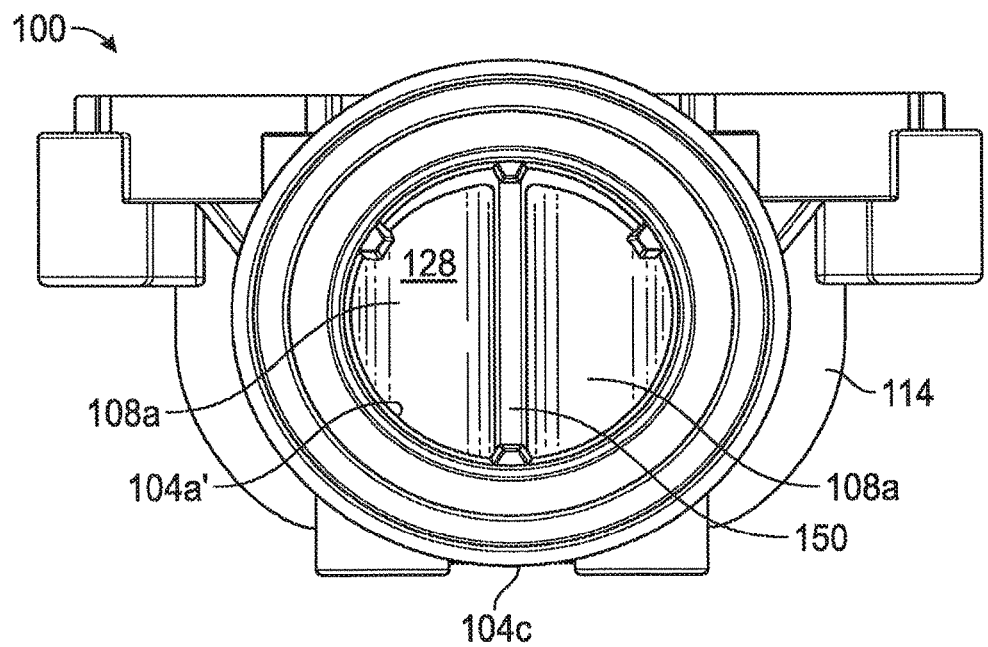
FIG. 5 is an end view of the valve of FIGS. 3A-3B.
Figure 6:
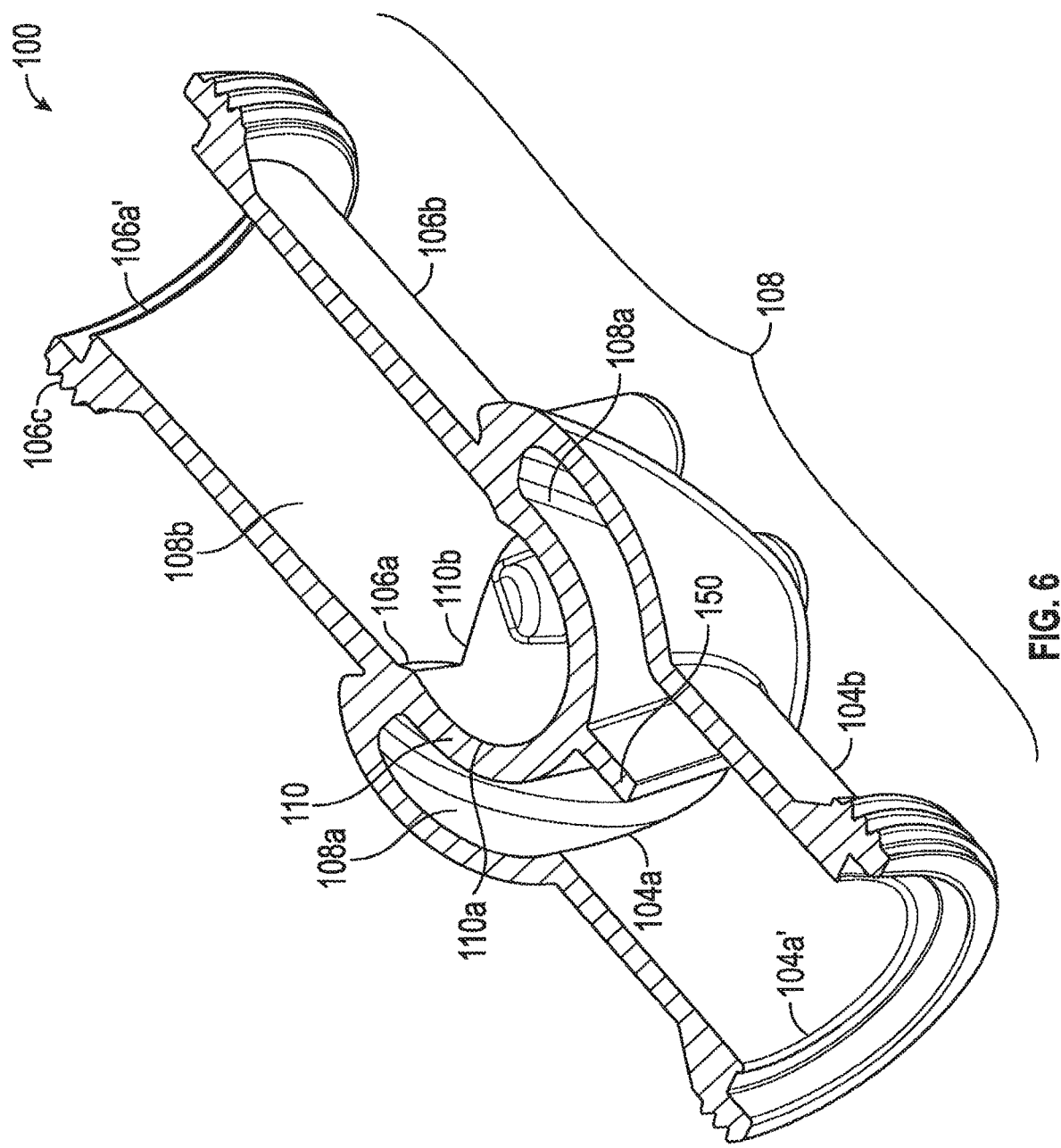
FIG. 6 is another cross-sectional perspective view of the valve of FIGS. 3A-3B.
Figure 7:
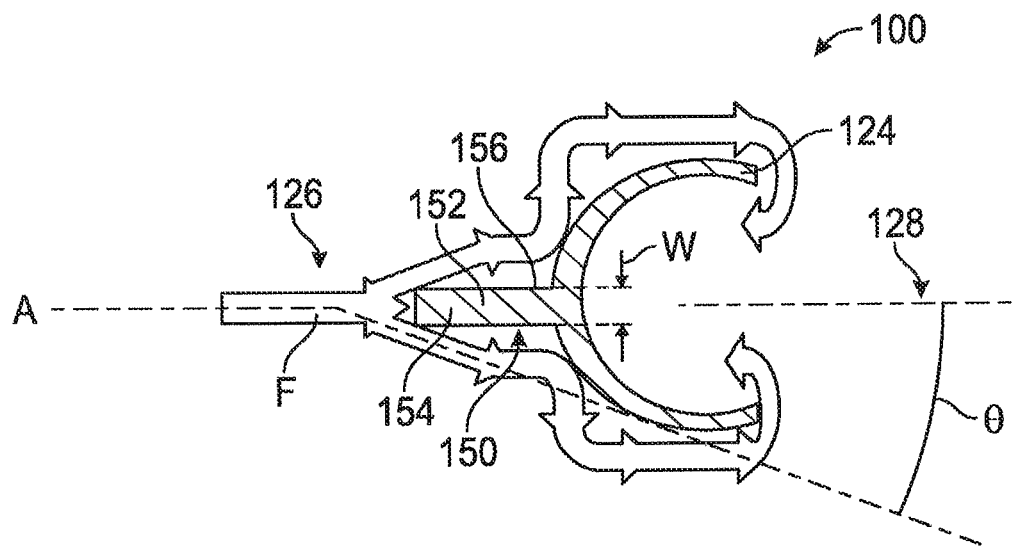
FIG. 7 is a schematic top view of a portion of a valve having a rib according to the disclosure.
Figure 8:
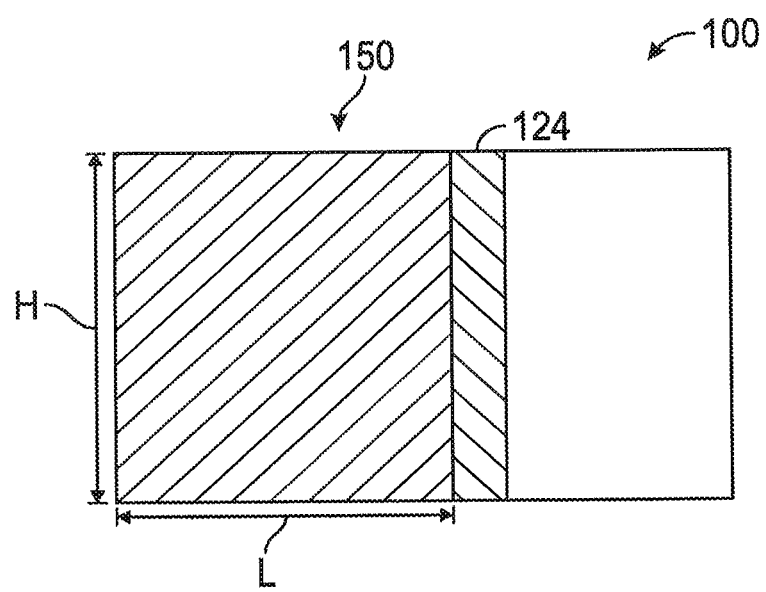
FIG. 8 is a cross-sectional side view of the valve portion of FIG. 7.
Figure 9:
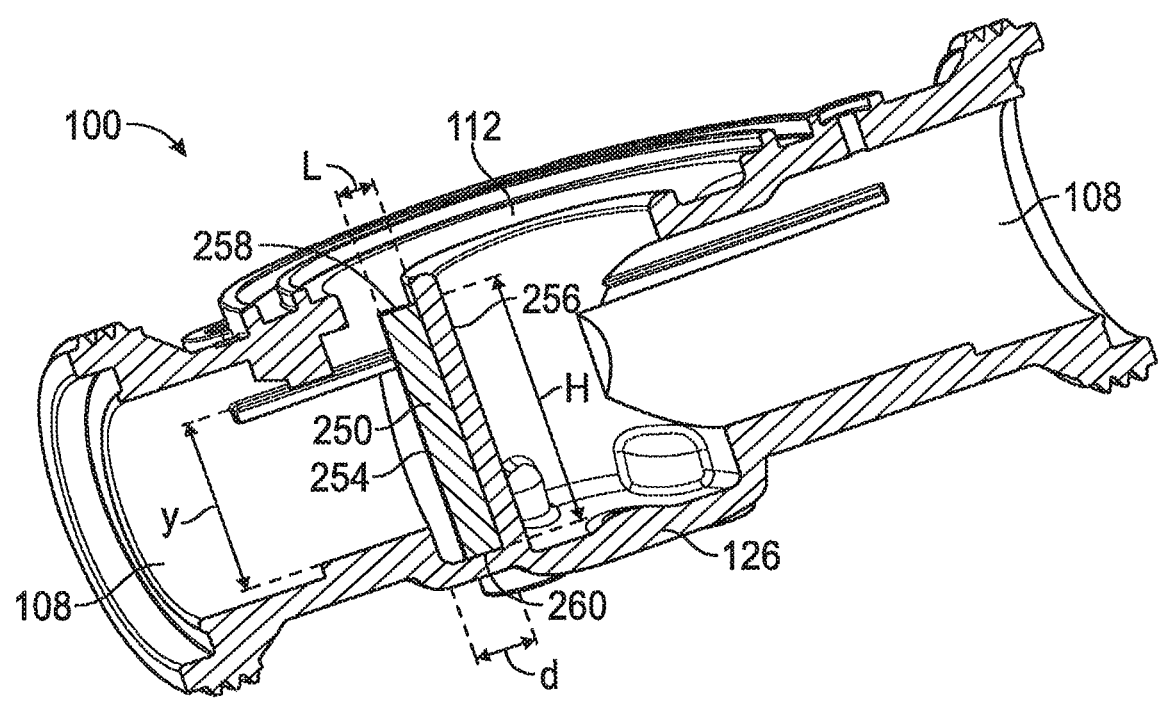
FIG. 9 is a cross-sectional perspective view of another of many embodiments of a valve having a rib according to the disclosure.
Figure 10:
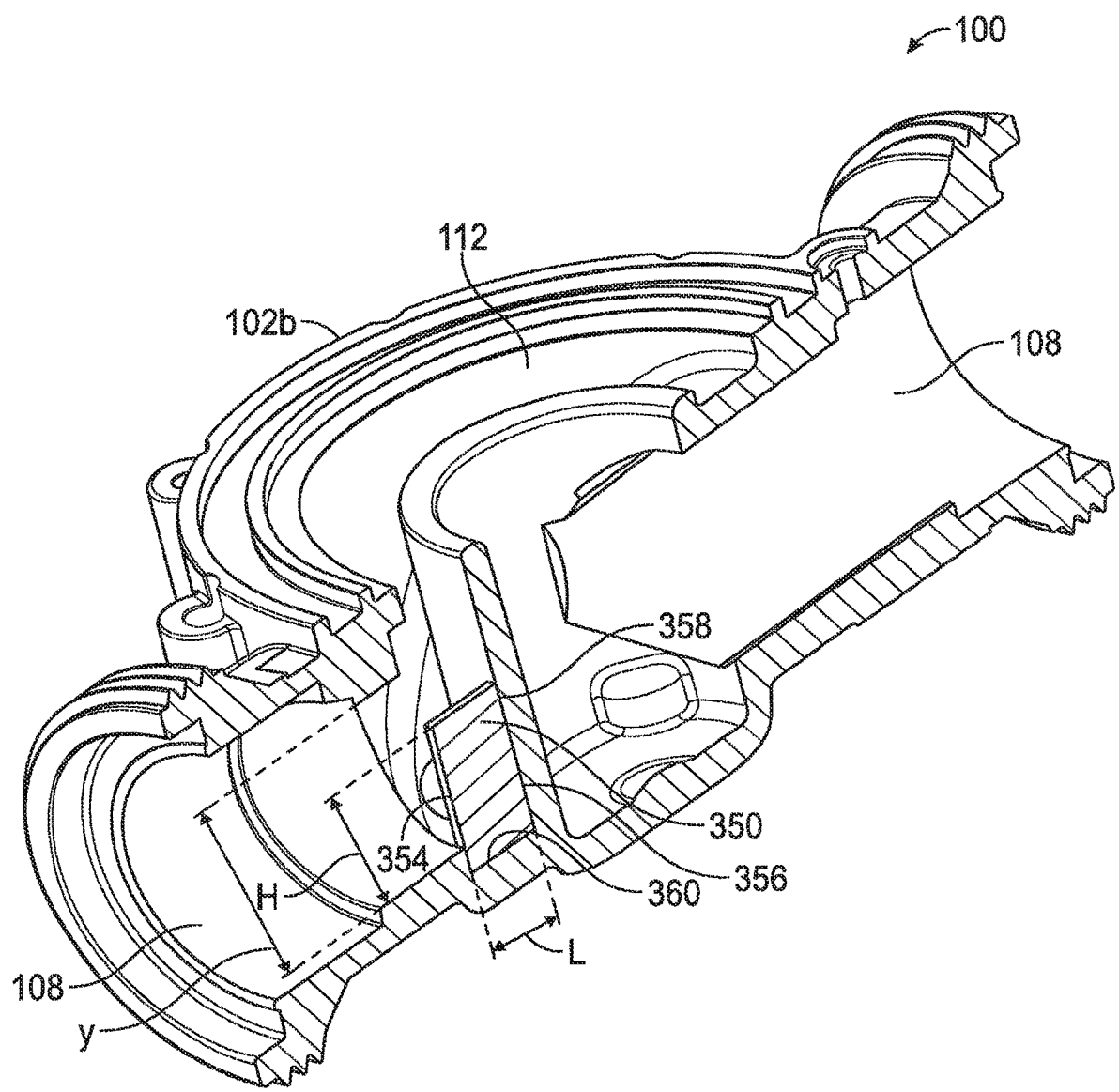
FIG. 10 is a cross-sectional perspective view of yet another of many embodiments of a valve having a rib according to the disclosure.

FIG. 3A is a perspective view of one of many embodiments of a valve having a rib according to the disclosure. FIG. 3B is a cross-sectional perspective view of the valve of FIG. 3A. FIG. 4 is a cross-sectional perspective view of the valve of FIGS. 3A-3B. FIG. 5 is an end view of the valve of FIGS. 3A-3B. FIG. 6 is another cross-sectional perspective view of the valve of FIGS. 3A-3B. FIG. 7 is a schematic top view of a portion of a valve having a rib according to the disclosure. FIG. 8 is a cross-sectional side view of the valve portion of FIG. 7. FIG. 9 is a cross-sectional perspective view of another of many embodiments of a valve having a rib according to the disclosure. FIG. 10 is a cross-sectional perspective view of yet another of many embodiments of a valve having a rib according to the disclosure. FIGS. 3A-10 will be described in conjunction with one another.

Valve 100 can include a valve body 102, such as a casing, encapsulation, bowl or housing, for enclosing, protecting or otherwise supporting one or more other valve components, and can include one or more inlets 104 for fluid flow into the valve and one or more outlets 106 for fluid flow out of the valve. Valve body 102 can be a single, unitary body or alternatively can include a plurality of valve body portions coupled together, and can be formed in any shape or manner required by a particular application. For example, as shown in the embodiment of FIGS. 3A-3B (collectively, "FIG. 3") for illustrative purposes, which embodiment is but one of many, body 102 can include a first body portion 102a and a second body portion 102b. Other variations are possible, and valve 100 can include any number of body portions according to a particular application, any of which can be coupled with one another in any applicable fashion. For example, valve 100 can, but need not, include one or more couplers 103 for coupling two or more valve components together, such as male couplers, female couplers, fasteners, receivers, adhesives or other coupling structure(s), separately or in combination. Inlet 104 can include a plurality of inlet components or other inlet portions coupled or otherwise disposed in fluid communication. For example, inlet 104 can include one or more inlet openings, such as an opening 104a in an inside surface 112 and an opening 104a' in an outside surface 114 of body 102, for allowing fluid flow in one or more directions between the inside and outside of body 102. Openings 104a, 104a' can have the same or different cross-sectional shapes and/or dimensions, which can be any shape(s) and dimension(s) according to a particular application. Inlet 104 can include an inlet conduit 104b for routing fluid or otherwise allowing fluid to move there through, such as from a distal location outside of valve 100 to or through inlet opening(s) 104a. Inlet 104 can include a coupler 104c, which can be or include a separate coupler or an integral coupler portion, in whole or in part, for coupling with other structure in a valve system, such as pipes, tubing, hoses, fluid sources, fluid receivers, fluid destinations or other conduits or components. As shown in FIGS. 3-6 for exemplary purposes, coupler 104c can include threads, but this need not be the case, and coupler 104c (if present) alternatively can be or include any type of fastener, fitting or other coupler now known or future developed, separately or in combination with one another. In at least one embodiment, coupler 104c can be or include a conduit end for joining with one or more other conduits, such as by brazing, welding, friction, adhesion, or in another manner. As will be understood by a person of ordinary skill in the art having the benefits of the present disclosure, the foregoing description regarding openings 104a, 104a', conduit 104b and coupler 104c can apply similarly to one or more other inlets, outlets and other fluid ways of valve 100. For example, as shown in the exemplary embodiment of FIGS. 3-6, which is but one of many, outlet 106 can include one or more outlet openings 106a, 106a', outlet conduits 106b and/or outlet couplers 106c. Alternatively, one or more of these components can be absent, as appropriate in accordance with a particular application. In the relevant field, some may refer to a valve as a "valve fitting," for example, when structure(s) such as conduits 104a, 106a or couplers 104c, 106c are present. As used in the present disclosure, the term "valve" includes "valve fittings" when referring to the device as a whole (e.g., valve 100), unless otherwise indicated.

Valve 100 can include one or more flow passages 108, such as a valve flow passage, reservoir or other flow path, for routing or otherwise directing fluid through the valve from inlet 104 to outlet 106 (or vice versa). Each flow passage 108 can include, or at least can be described to include for ease of illustration and explanation, two or more sub-flow passages (or component flow passages) that collectively make up the corresponding flow passage 108 through the valve. For example, in at least one embodiment, flow passage 108 can include one or more first passages 108a, such as an inlet or other flow passage, from inlet 104 to a location along passage 108 and one or more second flow passages 108b, such as an outlet or other flow passage, from such location to outlet 106. Valve 100 can include one or more other component flow passages as described in further detail elsewhere herein, separately or in combination with one another and/or any of first and second flow passages 108a, 108b. Further, each component flow passage can, but need not, comprise a plurality of passages or other paths between two or more points along flow passage 108 (see, e.g., flow passages 108a).

Valve 100 can include one or more orifices 110, such as structure defining or otherwise including an opening, conduit or other passageway, for at least partially restricting or otherwise affecting flow through the valve. Orifice 110 can be disposed at least partially within flow passage 108, such as fluidically between inlet 104 and outlet 106. Orifice 110 can be disposed at least partially within body 102, but need not be, and can alternatively be disposed outside of body 102 (wholly or partially) while nonetheless being configured for routing or otherwise allowing fluid to flow between inlet 104 and outlet 106 along flow passage 108. For example, orifice 110 can be disposed within a bypass or other conduit in fluid communication with another portion of flow passage 108 through or within body 102. Orifice 110 can, but need not, include a plurality of openings or other flow paths for defining a portion of one or more flow passages of valve 100, such as, for example, an orifice flow passage 111 forming a part of flow passage 108. Orifice 110 can include one or more orifice inlets 110a for allowing fluid to enter the orifice and one or more orifice outlets 110b for allowing fluid to exit the orifice.

Valve 100 can include an actuator assembly 116 for controlling fluid flow through at least a portion of valve 100, separately or in cooperation with one or more other valve components. Actuator assembly 116 can be coupled to valve body 102, in whole or in part, such as to one or more of first and second body portions 102a, 102b, and can, but need not, include additional body structure, such as a bonnet or the like. In at least one embodiment, actuator assembly 116 can include one or more valve members 120 and one or more actuators 118 for moving and/or retaining (or otherwise holding) valve member(s) 120 to, from or in one or more positions. Valve member 120 can have any number of positions according to a particular application For example, valve member 120 can have a fully closed position for maximizing resistance to flow through at least a portion of valve 100, which can include preventing flow there through. As another example, valve member 120 can have a fully open position for minimizing resistance to flow through at least a portion of valve 100, such as by minimizing flow resistance caused by valve member 120 or a portion thereof. Valve member 120 can have one or more partially open (or partially closed) positions between the fully open and fully closed positions for allowing fluid flow at one or more rates between a maximum and a minimum flow rate, which can be any flow rate(s) according to an embodiment or application at hand.

Actuator 118 can be or include structure for holding one or more valve members 120 in one or more positions and for moving such valve member(s) among positions, such as between two or more of the positions described above. For example, in the exemplary embodiment of FIG. 3, actuator 118 can move valve member 120 between opened and closed positions with respect to orifice 110. In such an embodiment, which is but one of many, valve 100 can include one or more valve seats 122 for optionally coupling with a corresponding valve member 120. Valve seat 122 can, but need not, be a portion of orifice 110 (e.g., of orifice inlet 110a) and/or valve body 102, in whole or in part. Valve member 120 and seat 122 can be configured to sealingly couple with one another for preventing or otherwise limiting fluid flow through one or more portions of flow passage 108, such as through orifice flow passage 111, in whole or in part. For instance, in at least one embodiment, valve 100 can have a fully closed position wherein valve member 120 and seat 122 are sealingly engaged for preventing flow into and/or through orifice 110 and one or more open positions wherein valve member 120 and seat 122 are not sealingly engaged and, rather, are disposed relative to one another for allowing fluid flow. Actuator assembly 116 can be or include any type actuator(s) and valve member(s) according to a particular application, whether now known or later developed.

Valve 100 can include one or more ribs 150, such as a fin, wall, brace, projection, foil or other structure, for guiding fluid flowing in or through one or more portions of valve 100. For example, one or more ribs 150 can be disposed within flow passage 108 and configured for reducing flow resistance across at least a portion of the flow path, such as by guiding fluid relative to one or more structures or other valve attributes so as to direct the fluid to move along the flow passage more efficiently. A rib 150 can have any size, shape and volume according to a particular application and can be coupled to one or more other valve components in any suitable manner, including being formed integrally therewith, in whole or in part. As shown in FIGS. 7-8, valve 100 can include one or more flow obstructions 124, which can be any structure that defines or forms at least a portion of a flow path in valve 100 (e.g., orifice 110), having an upstream side 126 and a downstream side 128 relative to a direction of flow of one or more fluids F (and/or other media) through the valve. Rib 150 can have a rib body 152 with a leading end 154, a trailing end 156 fluidically downstream of leading end 154, a top 158 and a bottom 160. One or more of leading end 154, trailing end 156, top 158 and a bottom 160 can, but need not, be coupled to one or more other valve components, in whole or in part, as further described elsewhere herein. In other words, the term "end" is used broadly herein, and can be or include a terminal end, but need not and can alternatively (or collectively) include an end that is integrally formed with or otherwise coupled to another component(s), in whole or in part. The top and bottom can also be referred to as ends (e.g., top end, bottom end), and the term "end" can include various types of ends, such as surfaces, sides, edges, contoured ends, curved ends, open ends, closed ends, and so on. Rib 150 can have one or more dimensions, such as a length L, height H and width (or thickness) W, and can be of uniform or non-uniform cross-section, in whole or in part. Rib 150 can be disposed within a path of fluid flow (as indicated by the arrows in FIG. 7) and can change a point or other location at which fluid F contacts obstruction 124, which can include preventing the fluid from coming in contact with at least a portion of one or more obstructions or other structure. Alternatively, or collectively, rib 150 can affect a direction in which fluid is flowing upon coming in contact with an obstruction 124 or portion thereof. For example, rib 150 can divert fluid flow at one or more angles θ relative to an axis A of valve 100 (e.g., an imaginary central longitudinal or other axis), which can be or include any angle according to a particular application (e.g., an angle between 0° and 90°, or another angle). One or more embodiments of rib 150 are described in further detail below.

With continuing reference to FIGS. 3-10, valve 100 can include an orifice 110, which can include an orifice body 126 defining at least a portion of orifice flow passage 111. Orifice 110 can be or include a portion of valve body 102, but this need not be the case and in at least one embodiment, at least a portion of orifice 110 can be formed separately from valve body 102 and disposed therein or coupled thereto. Orifice 110 can have one or more surfaces, such as an outer surface 128 and an inner surface 130, which can define at least a portion of a flow path of valve 100, such as valve flow passage 108, a component flow passage of passage 108, or another flow passage, separately or in combination. As shown in the exemplary embodiment of FIGS. 3-6, which is but one of many, one or more outer surfaces 128 can form a at least a portion of first flow passage 108a (and/or second flow passage 108b) and one or more inner surfaces 130 can form at least a portion of orifice flow passage 111. Remaining portions of flow passage 108 (including components passages thereof) can be formed or otherwise defined by one or more other valve components, for example by valve body 102, inlet 104, outlet 106, interior surfaces of any of them, or other valve parts, such as actuator 118, seat 122, etc., separately or in combination, in whole or in part. So that, for example, fluid (when present) moving into valve 100 can pass through inlet opening 104a and along first flow passage(s) 108a to orifice flow passage 111, orifice body 126 can be disposed apart from inlet opening 104a for defining a portion of first flow passage 108a there between. For instance, a distance d can exist between inlet opening 104a and outer surface 128 of orifice body 126 along axis A of valve 100. Distance d can be any distance according to a particular application or embodiment (e.g., a commercial or other embodiment) of valve 100, and is referred to herein along axis A for clarity of purpose and ease of explanation. The distance between an inlet 104a and orifice body 126 (or another valve component) can be the same or different along the height (or other dimension) of orifice body 126 or, as another example, along a dimension of inlet opening 104a. As explained elsewhere herein, inlet opening 104a can be any shape and size required by a particular application, and can have one or more flow dimensions accordingly. For example, opening 104a can be round or circular having a constant flow diameter, or can be another shape, such as elliptical, oblong, quadrilateral or otherwise, having more than one flow dimension across its cross-section, such as major, minor or other dimensions. Further, opening 104a can be planar (e.g., if located in a flat portion of body 102) or non-planar (e.g., if located in a non-flat portion of body 102, such as shown in FIG. 6 for exemplary purposes). For ease of explanation and clarity of purpose, opening 104a (and other openings disclosed herein) will be described as having a flow dimension y as depicted in FIG. 3B, however it will be understood that this can be any dimension, such as a diameter, major dimension, minor dimension, etc.

As shown in the exemplary embodiment of FIGS. 3-6, which is but one of many, rib 150 can be disposed at least partially downstream from inlet opening 104a, such as between (in whole or in part) inlet opening 104a and orifice body 126, for directing fluid flowing through opening 104a, such as to either side of leading end 154 and down first flow passage 108a. In at least one embodiment, rib 150 can be coupled (including integrally) to one or more other valve components. For example, trailing end 156 can be coupled to outer surface 128 of orifice body 126 and bottom 160 can be coupled to valve body 102, separately or in combination, in whole or in part. Further, rib 150 can have a length L the same or about the same as a distance d between inlet opening 104a and outer surface 128 and a height H the same or about the same (or greater than) flow dimension y of inlet opening 104a. In such an embodiment, which is but one of many, leading end 154 of rib 150 can, but need not, be coupled to body 102, such as, for example, to a portion of inside surface 114 surrounding, adjacent to or otherwise near inlet opening 104a. Alternatively, or collectively, leading end 154 can extend or otherwise pass into or through inlet opening 104a, such as toward inlet opening 104a', through opening 104a' and toward or into inlet conduit 104b. In such an embodiment, leading end 154 and/or another portion of rib 150 can be coupled to inlet 104, such as to an internal surface thereof, although this need not be the case.

With reference to FIG. 9, in at least one embodiment, valve 100 can include a rib 250 arranged differently than rib 150 in one or more respects. Rib 250 can have, for example, a height H as described with regard to rib 150 (or another height) and a length L that differs from the embodiment of rib 150. For instance, rib 250 can have a length L that is less a distance d between inlet opening 104a and orifice body 126, which can be any length according to a particular application. As shown in FIG. 9 for illustrative purposes, in at least one embodiment, length L of rib 250 can be half or about half of distance d; however, this need not be the case, and length L of rib 250 can be another length less than distance d, such as a length between about 1% and about 99% of distance d, or another length wherein d>L>0. Rib 250 can include one end coupled to another valve component and another end otherwise disposed in flow passage 108 between opening 104a and orifice body 126. For example, as illustrated in FIG. 9, trailing end 256 can be coupled to orifice body 126 and leading end 254 can be disposed opposite trailing end 256 toward inlet opening 104a. As another example, leading end 254 can be coupled to inside surface 112 of valve body 102 and trailing end 256 can be disposed opposite leading end 254 toward orifice body 126. In either case, rib 250 can, but need not be otherwise coupled within flow passage 108, such as at its top 258, bottom 260 or another location. As yet another example, rib 250 can be centrally or otherwise located so that gaps exists between at least a portion of leading and trailing ends 254, 256 and inside surface 112 and orifice body 126, respectively.

FIG. 10 shows yet another of many embodiments of a rib according to the disclosure. In such an embodiment, valve 100 can include a rib 350 arranged differently than ribs 150, 250 in one or more respects. Rib 350 can have, for example, a length L as described with regard to rib 150 (or another length) and a height H that differs from the embodiment of rib 150. For instance, rib 350 can have a height H that is less a flow dimension y of inlet opening 104a (including any distance (if present) between inlet 104a and a surface supporting the bottom 360 of rib 350), which can be any height according to a particular application. As shown in FIG. 10 for illustrative purposes, in at least one embodiment, height H of rib 350 can be half or about half of dimension y; however, this need not be the case, and height H of rib 350 can be another length less than dimension y, such as a height between about 1% and about 99% of dimension y, or another length wherein y (including any delta, if present)>H>0. Rib 350 can include one end coupled to another valve component and another end otherwise disposed in flow passage 108. For example, as illustrated in FIG. 10, bottom 360 can be coupled to valve body 102 and top 358 can be disposed opposite bottom 360. As another example, top 358 can be coupled to valve body 102 or another component above rib 350 and bottom 360 can be disposed opposite top 358, such as toward a bottom portion of inside surface 112 of valve body 102. In either case, rib 350 can, but need not be otherwise coupled within flow passage 108, such as at its leading end 354, trailing end 356, or another location. As yet another example, rib 350 can be centrally or otherwise located so that gaps exists above and below the top 358 and bottom 360 of rib 350. As in the case of rib 250, the gaps (if present) can, but need not, be the same size.

As shown in the exemplary embodiments of FIGS. 3-10, a rib according to the disclosure can have one or more ends, sides and/or faces that are generally parallel to an opening (e.g., opening 104a, opening 106a). However, this need not be the case and, alternatively (or collectively) one or more portions of a rib can be angled relative to an opening or other portion of valve 100, such as a surface of valve body 102. For example, in at least one embodiment, the leading end 154 of rib 150 can be curved or otherwise shaped such that the length of the rib varies along its height or, as another example, such that the distance between leading end 154 and valve body 102 or opening 104a varies along the height of rib 150, in whole or in part, separately or in combination. Similarly, rib 150 can be generally perpendicular to opening 104a (or another portion of valve 100), but this need not be the case and, in at least one embodiment, rib 150 can be disposed at another angle relative thereto, which can be any angle according to an embodiment or application at hand. Further, rib 150 can reside on a plane bisecting one or more valve openings (e.g., opening 104a, opening 106a), but need not, and can alternatively be offset from such a plane. The descriptions of rib 150 above and one or more other rib embodiments below can apply to a rib disposed elsewhere in or on valve 100 or valve flow path 108, which can be anywhere along a valve flow path. For example, one or more ribs can be disposed at least partially in or near inlet 104, outlet 106, orifice 110 or in one or more locations along flow paths there between. In at least one embodiment, a rib (e.g., rib 150) can be or include a plurality of ribs disposed next to one another, or in succession, separately or in combination, in whole or in part. As another example, a rib according to the disclosure can, but need not, have a solid cross-section. For instance, in at least one embodiment, which is but another one of many, rib 150 can have one or more openings therein or there through, which can include being wholly or partially hollow.

Figure 11:
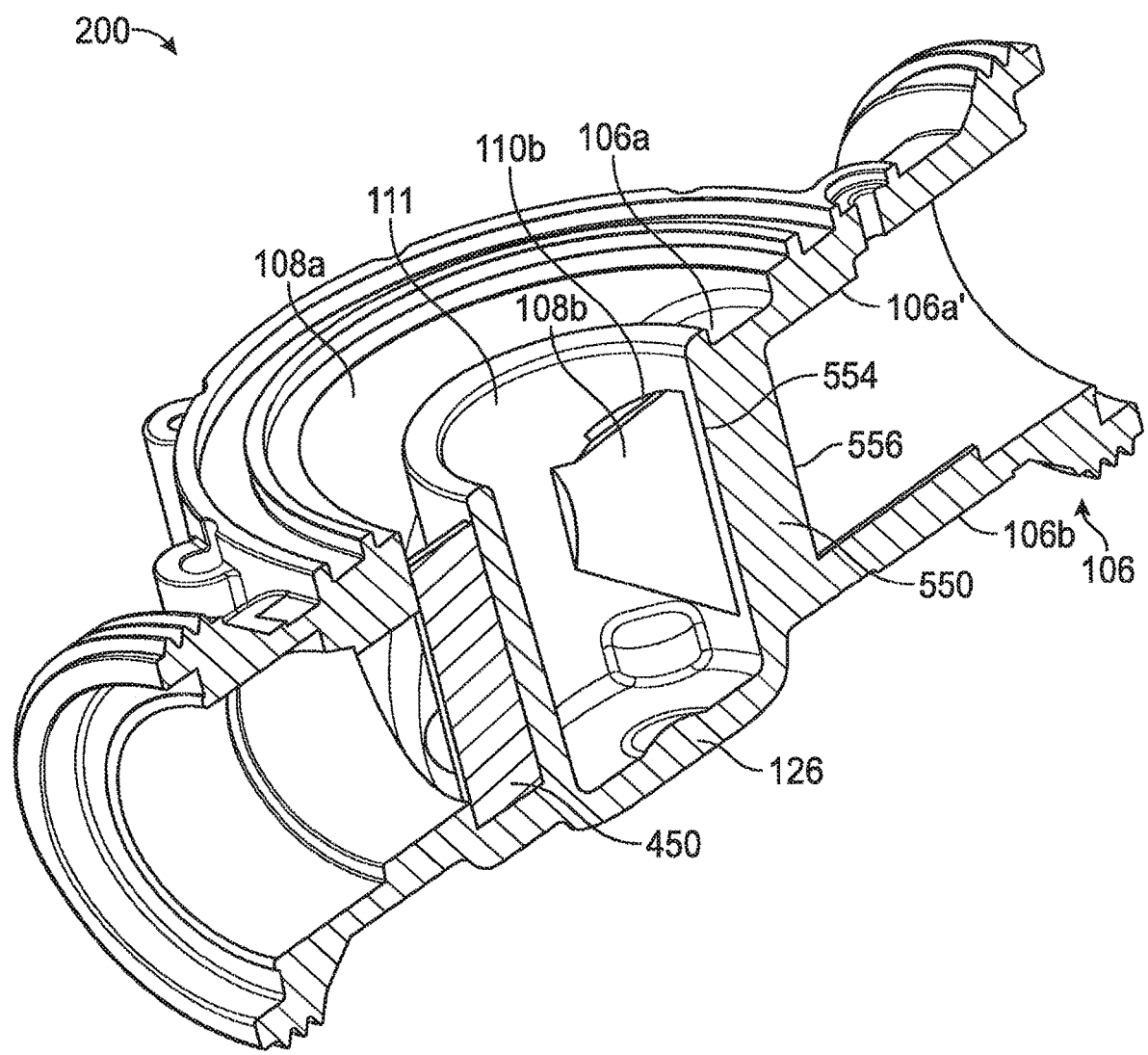
FIG. 11 is a cross-sectional perspective view of one of many embodiments of a valve having a plurality of ribs according to the disclosure.

FIG. 11 is a cross-sectional perspective view of one of many embodiments of a valve having a plurality of ribs according to the disclosure. FIG. 12 is another cross-sectional perspective view of the valve of FIG. 11. FIGS. 11-12 will be described in conjunction with one another. Valve 200 can, but need not, be the same as valve 100 (described above) in one or more respects. Similar reference numerals may be used for similar elements, which elements need not be described again in detail here. Although different reference numerals may be used for convenience and clarity of purpose in some instances, the corresponding features may be the same as, or different from, those in system 100 or one or more other embodiments of the present disclosure. In at least one embodiment, valve 200 can include a plurality of ribs disposed in valve flow passage 108, such as, for example, a first rib 450 and a second rib 550. First rib 450 can be located in inlet flow path 108a and second rib 550 can be located in outlet flow path 108b, although this need not be the case and other variations are possible. For example, a plurality of ribs can be located in one or both of inlet flow passage 108a and outlet flow passage 108b or, as another example, one or more ribs can be located in orifice flow passage 111. Each of first rib 450 and second rib 550 can be any shape and size according to a particular application, including, but not limited to being or including one or more of the other rib embodiments disclosed herein (e.g., rib 150, rib 250, rib 350, etc.). Ribs 450, 550 can have the same or different cross-sectional shapes and/or dimensions. As shown in FIGS. 11-12 for illustrative purposes, in at least one embodiment, second rib 550 can be disposed between orifice outlet 110b and the outlet 106 of valve 200, which can, but need not, include being disposed at least partially within or through one or more of orifice body 126, outlet openings 106a, 106a' and, as another example, outlet conduit 106b (if present). As fluid flows through valve flow passage 108 from orifice 110 to outlet 106 (i.e., when valve 200 is at least partially open), second rib 550 can direct or otherwise affect fluid flow for at least partially reducing flow resistance in second flow passage 108b relative to, for example, the valve absent second rib 550. For instance, second rib 550 can gradually introduce flowing fluid into a downstream portion or section of the valve, can at least partially direct fluid around one or more other objects in valve flow path 108 or, as another example, can at least partially prevent flow from tripping (e.g., on a corner or edge) and becoming turbulent, separately or in combination, in whole or in part. Similarly to one or more other rib embodiments disclosed herein, second rib 550 can have one or more ends, such as leading end 554 and trailing end 556, adapted for at least partially reducing a likelihood of flow turbulence in at least a portion of valve flow path 108. For example, leading end 554, trailing end 556 or another portion of second rib 550 (or any other rib according to the disclosure, e.g., ribs 150, 250, etc.) can be contoured for eliminating or dulling corners and/or other sharp edges, which can include being tapered, smoothed, sloped, filleted, curved or otherwise shaped, separately or in combination, in whole or in part.

As described in more detail herein, a rib can be shaped to at least help maximize flow in or through at least a portion of a valve. For example, a rib can have rounded or otherwise contoured corners or other portions, such as edges, and one or more walls or other surfaces can be smooth, which can at least help reduce frictional losses. A taper on a front or leading face or end can gradually introduce media to the rest of the rib and/or prevent at least some fluid flow from contacting one or more downstream objects (e.g., orifices, walls, flow path structure, etc.) in manners that may cause the fluid to change directions, such as by doubling back on itself. A back, rear or trailing face or end can be tapered (see, e.g., FIG. 12), which can smoothly introduce flow into a section of the valve (e.g., to help flow around an object) and/or at least help prevent flow from tripping on a valve component and becoming turbulent, such as by changing flow directions. FIG. 13 is a side view of one of many embodiments of a rib 650 having a curved end 652 according to the disclosure. Curved end 652, which can be any end, such as a trailing, leading or other end, can be curved in whole or in part and curved portion 654 can be or include any nonlinear shape according to a particular application. A face of curved end 652 can, but need not, be at least partially rounded. One or more other ends 656, which can be any end (including the top or bottom ends) can be square or alternatively can be contoured the same as or differently from curved end 652, separately or in combination, in whole or in part. Factors influencing the effectiveness of ribs can include the geometries of the ribs and of the valves they are in. In at least one embodiment, a rib can be placed and arranged so that the rib has little or no adverse effect on valve functionality. A rib's geometry can be dependent upon a corresponding valve's geometry. For example, a rib can be sized and shaped so that it is neither too large nor too small relative to the valve or flow path in which the rib is disposed. If a rib is too large it can act as a flow restriction by reducing the overall cross sectional area through which media can flow. A rib that is too wide compared to a cross sectional area of the flow can act like a flat wall, which can cause eddy currents and turbulent flow. If a rib is too narrow or otherwise too small it can act as a sharp corner tripping flow into turbulence and decreasing a flow rate within or through a valve. As a rule of thumb, the cross-sectional area with the rib should not be the smallest cross-sectional area in the flow path, although this need not always be the case. Effects of adding one or more ribs can be confirmed with a flow rate test.

A rib in accordance with this disclosure can increase a flow rating of a valve relative to the valve absent the rib. For example, in one embodiment of a valve according to the present disclosure, Applicants coupled a rib in the inlet of a 1 inch composite plastic valve to direct flow around an orifice wall in the bowl of the valve. The rib was formed from glass-filled plastic, shaped like a thin rectangle and had dimensions of approximately 29×8×2 mm. The valve was tested using water as the fluid at an ambient temperature of approximately 23° C. and an inlet pressure of approximately 30 psi. In this example embodiment, which is but one of many, the valve's Cv was increased by about 10% (from 12.13 to 13.53). However, this need not, and likely will not, be the case for all valves having one or more ribs according to Applicants' disclosure. In one or more other embodiments, a valve's Cv can be increased by less or more than at least about 10%, which can be any amount according to a particular valve or valve application at hand. For example, the addition of one or more ribs to a valve in accordance with the disclosure (which can be any type of valve, whether now known or future developed) can increase the valve's Cv by an amount between about 1% and about 99%, or less, or more. Factors that can affect a maximum change in Cv for a valve at hand can include, but are not limited to, valve geometry, valve type, valve flow resistance, flow rate, fluid or other media type, fluid properties (e.g., viscosity, specific gravity, etc.) head drop, pressure drop, temperature and atmospheric pressure, among others, such as pipe size, pipe schedule, and valve stroke.

In at least one embodiment, a rib in accordance with the disclosure can support a valve or valve portion structurally, such as by stiffening or otherwise strengthening the valve or a portion thereof, separately or in combination with increasing the valve's Cv rating as described elsewhere herein. For example, one or more of the ribs disclosed herein can be or act as a brace, beam or other supporting structure for increasing a valve's resistance to stress, strain, torque, shock, vibration, impact or other external or internal forces, such as due to fluid pressure. In at least one embodiment, a valve having one or more ribs according to the disclosure can allow the use of an at least partially plastic or other non-metal valve or valve component in place of a metal one and/or the use of a smaller valve or valve component in place of a larger one. In at least one embodiment, a rib in accordance with this disclosure can support coupling of a valve or portion thereof with a conduit, such as a pipe, tube or other fluid carrier. For example, one or more ribs can be shaped and arranged to limit a length of conduit that can be inserted into a valve, such as to provide a pipe stop, hard pipe stop or other type of stop or limiter. As another example, one or more ribs can serve to align a conduit for coupling with a valve, such as by forming a key or other structure for mating with a corresponding slot, opening or other coupler. In at least one embodiment, a rib can be a hard pipe stop for a valve coupled with PVC (polyvinyl chloride), CTS (copper tube size) or other conduit. In at least one embodiment, one rib or multiple ribs can support a valve diaphragm (if present) or, as another example, can replace a secondary component, such as a piston guide, which can include strengthening the valve in one or more manners disclosed herein. For instance, in at least one embodiment of the present disclosure, a rib can be created in the body in such a way as to guide the piston from within the valve as well as strengthen the valve.

Figure 14:
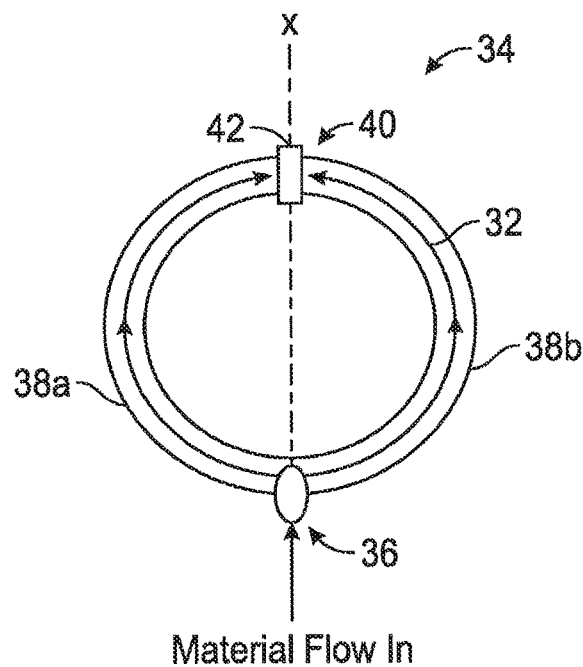
FIG. 14 is a schematic view illustrating a conventional valve component molded without a rib.
Figure 15:
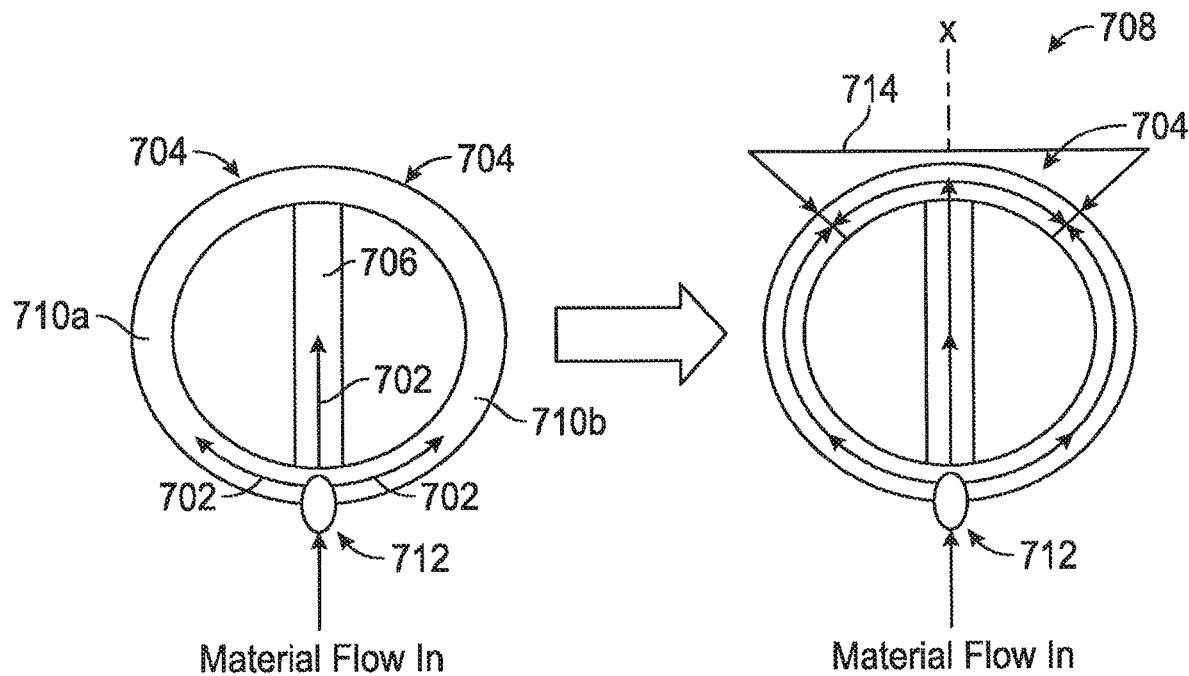
FIG. 15 is a schematic view illustrating one of many embodiments of a valve component molded with a rib according to the disclosure.
Figure 16:
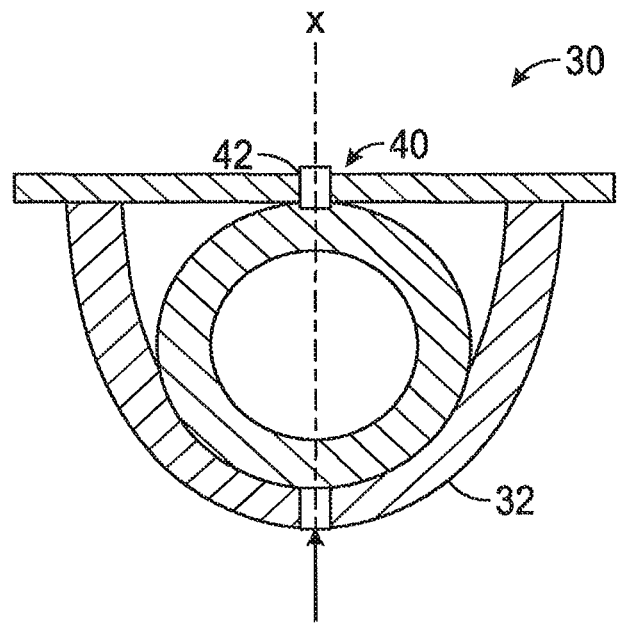
FIG. 16 is a cross-sectional view illustrating a conventional valve component molded without a rib.
Figure 17:
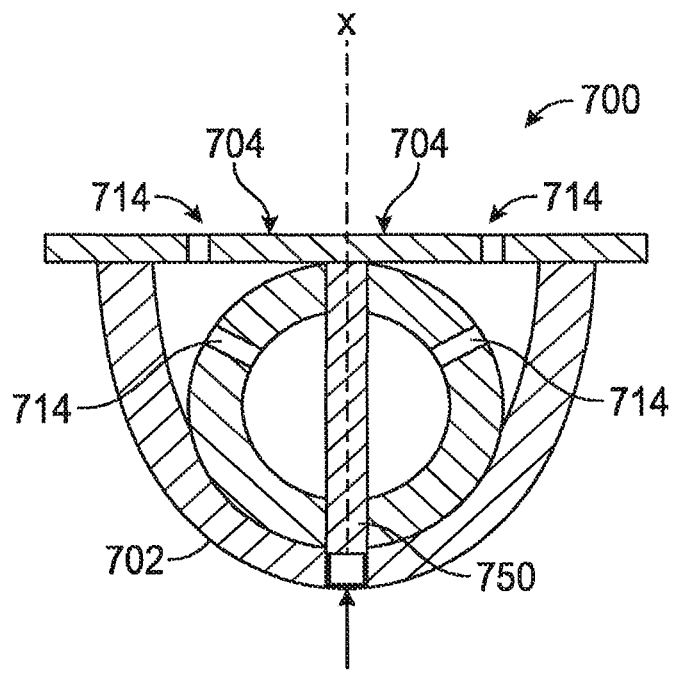
FIG. 17 is a cross-sectional view illustrating one of many embodiments of a valve component with a rib according to the disclosure.

FIG. 14 is a schematic view illustrating a conventional valve component formed without a rib. FIG. 15 is a schematic view illustrating one of many embodiments of a valve component formed with a rib according to the disclosure. FIG. 16 is a cross-sectional view illustrating a conventional valve component formed without a rib. FIG. 17 is a cross-sectional view illustrating one of many embodiments of a valve component formed with a rib according to the disclosure. FIGS. 14-17 will be described in conjunction with one another. Separately or in combination with improving the Cv of a valve and/or supporting a valve structure in at least one of the manners described above, in at least one embodiment, a rib according to the disclosure can support a valve structure (e.g., by supporting the forming or making thereof) by moving, determining or otherwise affecting the location of one or more material junctions, such as a weld line, meld line or other knit line. A knit line can be formed where two or more material streams or flow fronts meet during formation of a valve component or portion thereof, such as when formed by molding. As illustrated in FIGS. 14 and 16, a conventional valve component 30 can be formed by directing valve material 32 (e.g., in liquid form) into a mold 34, such as through a gate 36, and along two or more material flow paths 38a, 38b until the material flows reach a common location 40. Upon doing so, the flows can combine with one another, but in at least some cases may not do so completely, for example, due to cooling of the material over the time period that elapsed as the materials traveled from gate 36 to common location 40. In this manner, one or more knit lines 42 can be formed, such as along an axis X, which can be or include a relatively weak area in the structure of valve component 30.

In at least one embodiment of a valve having one or more ribs according to the disclosure (e.g., any of valves 100, 200), the valve can, but need not, be wholly or partially formed by molding, such as by injection molding. For example, one or more valve components 700, which can be or include any valve component (e.g., a valve body, orifice, or other valve structure) or portion thereof, can be molded and at least a portion of one or more ribs 750 can be integrally molded therewith. In such embodiments, which are but a few of many, rib 750 can be shaped and arranged for supporting material flow during the molding process, which can improve a molded structure by shifting or otherwise moving a knit line to a more desirable location, such as by moving the knit line away from thin or relatively weak areas of a valve and into thicker or otherwise stronger sections. As another example, rib 750 can, but need not, both relocate one or more knit lines and tie a relatively weak section of a valve into a relatively stronger valve portion, which can provide extra support or otherwise improve the overall structural integrity of the valve or a portion thereof. In at least one embodiment, one or more ribs 750 can be disposed in valve component 700 for allowing valve material 702 to flow directly or otherwise more freely or rapidly to one or more valve portions 704, such as through a rib flow path 706, whether separately or in combination with material flows in other parts of a mold 708, such as longer or more restrictive material flow paths 710a, 710b. In at least one embodiment, a rib can at least help keep the temperature of a material up during valve formation, such as by decreasing the time required to completely form a valve or valve part, separately or in combination, in whole or in part. Factors that can influence the effectiveness of a rib in these regards can include, but are not limited to, the proximity of the rib to a mold gate 712, the shape, size and volume of rib 750, and the type of valve material(s) 702 with which each valve or valve component 700 is formed, which can be any valve part or other component according to a particular application. In at least one embodiment, rib flow path 706 can be shorter than one or more other flow paths in mold 708, such as flow paths 710a, 710b.

In at least one embodiment, at least a portion of rib 750, such as a leading, trailing or other end, can be located close to gate 712 of mold 708, which can allow valve material 702, such as hot valve material, to quickly travel through the rib for filling out one or more portions 704 of the mold. The rest of the mold can continue to fill until two or more sections of material meet and weld or otherwise couple together. Due to the presence of rib 750, one or more knit lines 714 can be formed in different locations as compared to a fill without the rib present, such as in a location off of axis X instead of along axis X as in the conventional example of FIGS. 14 and 16. The location of the knit line(s) 714 can depend, for example, on how quickly material 702 travels to a target area (e.g. valve portions 704) and how much of a mold is filled from that location. In other words, with reference to the exemplary embodiment of FIGS. 14 and 16, the faster material 702 moves from gate 712 through rib flow path 706 and into portions 704, the further from axis X knit lines 714 may form.

The shape of rib 750 can depend on the thickness, height, length or other dimension(s) of the rib. The cross-sectional area of rib 750, which can be any area and shape according to a particular embodiment, can be regulated in a way such that it is neither too thick (which can affect, e.g., valve material or valve functionality) nor too thin (relatively thin components can be difficult to mold, which can increase fill time and potentially adversely affect a knit line). The shape of rib 750 can be dependent on valve geometry; for example, a distance from the start to the end of rib 750 can affect the knit line(s). In at least one embodiment, which is but one of many, a distance from the start of a rib to the end can be shorter than a distance material flowing through other portions of a mold (i.e., portions other than the rib) flow to reach the area at which the rib ends. If a rib is too long, for example, material flowing through the rib may not have a chance to fill a target area (e.g., portions 704) before the other material flow(s). This can result in the valve being formed with a relatively weak knit line area, which can include a knit line located on the rib, such as along axis X.

For example, using the above-mentioned 1 inch composite embodiment of a valve having a rib according to the present disclosure, Applicants conducted a hot life cycle test. The valve was tested using water as the fluid at a temperature of approximately 82° C. and a pressure of approximately 150 psi at the valve inlet with a pressure drop of about 20% across the valve. In this example embodiment, which is but one of many, the valve's life was increased from about 400,000 cycles to about 800,000 cycles, or an improvement of approximately 100%. However, this need not, and likely will not, be the case for all valves having one or more ribs according to Applicants' disclosure. In one or more other embodiments, a valve's life can be increased by less or more than at least about 100%, which can be any amount according to a particular valve or valve application at hand. For example, the addition of one or more ribs to a valve in accordance with the disclosure (which can be any type of valve, whether now known or future developed) can increase the valve's life by an amount between about 1% and about 200%, or less, or more. Factors that can affect a maximum change in cycle life for a valve at hand can include, but are not limited to, valve geometry, valve type, valve flow resistance, flow rate, fluid or other media type, fluid properties (e.g., viscosity, specific gravity, etc.) head drop, pressure drop, media temperature and atmospheric pressure, among others, such as water hammer.

The systems and methods disclosed herein are not limited to the exemplary valve types shown in the Figures for illustrative purposes and can be applicable or applied to many different types of valves, valve components and valve combinations. Valve 100 et seq. can be or include any type of valve, whether now known or later developed, such as, for example, linear, rotary, solenoid, pilot, diaphragm, mechanical, electromechanical, hydraulic, pneumatic and other types of valves for manipulating the passage of one or more fluids across a distance or point, separately or in combination, in whole or in part. The term "fluid(s)" as used herein includes any substance or material capable of flowing, such as, for example, liquid(s), gas(es) and combinations thereof (regardless of whether one or more solids or other non-fluids may be present therein).

A method of forming or making a valve can include forming a valve body having an inlet, an outlet and one or more flow paths there between, and forming or otherwise coupling one or more ribs fluidically within at least one flow path. A method can include disposing a rib in or along a component flow path, such as an inlet or outlet flow path, of an overall valve flow path through a valve or portion thereof. A method can include coupling one or more ribs in a valve flow path and improving a flow rating of a valve, such as relative to a flow rating of the valve absent the one or more ribs. A method can include forming, making, providing, using, producing or manufacturing a valve having a rib according to the disclosure. A method can include disposing a rib downstream of a valve inlet, such as a rib having a dimension smaller than, larger than or equal to a dimension of an inlet opening. A method can include coupling one or more ribs to at least one valve component or other structure of a valve, such as a rib having a constant or variable cross-sectional area along at least one dimension. A method can include forming at least a portion of a valve having a rib by molding, such as injection molding. A method can include forming at least a portion of a valve having a rib by moving valve material through a rib flow path of a mold. A method can include forming at least a portion of a valve having a rib with one or more knit lines, which can include forming at least one knit line in a different location relative to a valve without a rib. A method can include forming at least a portion of a valve having a rib with one or more off-center knit lines, such as a knit line located at least partially off of an imaginary or other axis passing through the rib. One or more of the valves, components and other features disclosed herein can be formed in any manner(s) and from any material(s) (e.g., plastic, metal and/or other material(s)) required by a particular application or embodiment at hand, and can be made separately or collectively, in whole or in part.

A valve can include a body, one or more openings for allowing fluid flow into or out of the body, one or more flow passages or other fluid paths and one or more ribs or other structures for routing fluid disposed within a flow passage or other fluid path. A valve can include an orifice or other opening fluidically between an inlet and an outlet. A flow path can include a plurality of flow paths, which can include an inlet flow path and an outlet flow path. A valve can include one or more ribs in an inlet flow path, an outlet flow path, another flow path, or a combination thereof. A valve can include a rib having one or more dimensions that are less than, equal to, or greater than one or more dimensions of an opening in a valve, such as in a valve body. A valve can include a rib having one or more areas, such as cross-sectional, end, side or face areas, that are less than, equal to, or greater than one or more areas of an opening in a valve, such as in a valve body. A valve can include one or more ribs coupled to one, two or more surfaces or objects in or on the valve, which can include a first, second or other rib coupled to a valve body or other structure in one, two or more places or locations about the rib or valve. A valve can include one or more ribs shaped and arranged for affecting a flow coefficient or factor of the valve, which can include being shaped, sized or disposed so that the valve's flow rating is greater than it would be absent one or more of the ribs. In at least one embodiment, a valve can include a rib for preventing fluid or other material from contacting one or more portions of a valve, such as at least a portion of a valve flow passage or of a structure forming at least a portion of the valve flow passage. A valve can include an injection molded or otherwise molded valve body or valve body portion, which can include one or more knit lines or other structural inconsistency. A valve can include a rib formed and arranged so that a knit line is in a different location or valve portion than it would be absent the rib. A valve can include a rib formed and arranged so that the valve has a greater or lesser number of knit lines and/or a different knit line(s) than it would have absent the rib. A valve can include a rib formed and arranged so that the valve has at least one off-center knit line. A valve can include a rib that spans at least partially across an opening, at least partially bisects an opening, intersects an opening, exists on one or more planes intersecting an opening or a plane or axis of an opening, affects fluid leaving an opening, affects fluid entering an opening or otherwise affects valve flow, separately or in combination, in whole or in part.

Other and further embodiments utilizing one or more aspects of the systems and methods described above can be devised without departing from the spirit of Applicants' disclosures. For example, the systems and methods disclosed herein can be used alone or to form one or more parts of other valves, valve components and/or fluid control systems. Further, the various methods and embodiments of the valves and ribs can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions.

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:

1. A valve, comprising:
   a valve body having a bowl, the bowl having a top interior surface and a bottom interior surface;
   an inlet that allows fluid flow into the valve body in a direction parallel to a central longitudinal axis of the inlet, wherein the inlet comprises a first inlet opening at a terminal end fluidically upstream from a second inlet opening into the bowl;
   an outlet that allows fluid flow out of the valve body;
   an orifice disposed fluidically between the inlet and the outlet, the orifice having an orifice body disposed at least partially within the bowl and an orifice inlet fluidically upstream from an orifice outlet;
   a valve flow passage from the inlet to the outlet, wherein the valve flow passage comprises an inlet flow passage from the inlet to the orifice and an outlet flow passage from the orifice to the outlet;
   a first rib disposed in the valve flow passage fluidically between the inlet and the outlet, the first rib having a height and a leading end disposed fluidically upstream from a trailing end; and
   a second rib disposed in the valve flow passage fluidically between the inlet and the outlet, the second rib having a height and a leading end disposed fluidically upstream from a trailing end;
   wherein one of the first and second ribs is disposed in the inlet flow passage and the other of the first and second ribs is disposed in the outlet flow passage;
   wherein at least a portion of each of the first and second ribs extends from the top interior surface to the bottom interior surface of the bowl and across a flow area of the valve flow passage;
   wherein at least a portion of each of the first and second ribs is disposed in contact with the orifice body;
   wherein the leading end of the first rib has a face in fluid communication with the valve flow passage;
   wherein the leading end of the second rib has a face in fluid communication with the valve flow passage; and wherein the faces of the leading ends of the first and second ribs are parallel to one another and perpendicular to the central longitudinal axis of the inlet.

2. The valve of claim 1, wherein the first rib is disposed in the inlet flow passage fluidically between the second inlet opening and an exterior surface of the orifice body that intersects the central longitudinal axis of the inlet, and wherein at least a portion of the trailing end of the first rib is coupled to the exterior surface of the orifice body.

3. The valve of claim 1, wherein the first rib is disposed in the outlet flow passage, and wherein at least a portion of the leading end of the first rib is coupled to an exterior surface of the orifice body.

4. The valve of claim 1, wherein the leading end of the first rib is vertical and has a top end and a bottom end, and wherein each of the top and bottom ends of the leading end of the first rib is coupled to the bowl.

5. The valve of claim 1, wherein the first and second ribs are of different cross-sectional shapes.

6. The valve of claim 1, wherein at least a portion of the leading end of the first rib is coupled to an interior surface of the bowl.

7. The valve of claim 1, wherein the orifice body has a central longitudinal axis perpendicular to the central longitudinal axis of the inlet of the valve, wherein an exterior surface of the orifice body forms a wall of the inlet flow passage, and wherein the trailing end of the first rib is coupled to the exterior surface of the orifice body.

8. The valve of claim 1, wherein the bowl comprises an inside surface having the second inlet opening therein, wherein at least a portion of the leading end of the first rib is coupled to the inside surface of the bowl, and wherein the first rib bisects the second inlet opening.

9. The valve of claim 1, wherein the leading end of the first rib is disposed fluidically downstream from the second inlet opening.

10. The valve of claim 1, wherein the trailing end of the second rib comprises a face that is perpendicular to the central longitudinal axis of the inlet and in fluid communication with the valve flow passage.

11. The valve of claim 1, wherein the trailing end of the first rib is coupled to an exterior surface of the orifice body.

12. The valve of claim 1, wherein the bowl comprises a radially inside surface having the second inlet opening therein and a height, and wherein the height of the first rib is greater than a major flow dimension of the second inlet opening and less than the height of the radially inside surface of the bowl.

13. The valve of claim 1, wherein the first rib prevents fluid from contacting at least a portion of the orifice body that is perpendicular to the central longitudinal axis of the inlet.

14. The valve of claim 1, wherein the first rib has a cross-sectional area that varies along at least one dimension of the first rib.

15. The valve of claim 1, wherein at least one of the top and bottom interior surfaces of the bowl is a radially interior surface.

16. A valve, comprising:
a valve body having a bowl, the bowl having a top interior surface and a bottom interior surface;
an inlet that allows fluid flow into the valve body in a direction parallel to a central longitudinal axis of the inlet, wherein the inlet comprises a first inlet opening at a terminal end fluidically upstream from a second inlet opening into the bowl;
an outlet that allows fluid flow out of the valve body;
an orifice disposed fluidically between the inlet and the outlet, the orifice having an orifice body disposed at least partially within the bowl, and an orifice inlet fluidically upstream from an orifice outlet;
a valve flow passage from the inlet to the outlet, wherein the valve flow passage comprises an inlet flow passage from the inlet to the orifice and an outlet flow passage from the orifice to the outlet; and
a plurality of ribs disposed in the valve flow passage fluidically between the first inlet opening and the outlet, each of the plurality of ribs having a leading end disposed fluidically upstream from a trailing end;
wherein the plurality of ribs comprises a first rib disposed in the inlet flow passage and a second rib disposed in the outlet flow passage;
wherein at least a portion of each of the first and second ribs extends from the top interior surface to the bottom interior surface of the bowl and across a flow area of the valve flow passage;
wherein at least a portion of each of the first and second ribs is disposed in contact with the orifice body;
wherein the leading end of the first rib has a face in fluid communication with the valve flow passage;
wherein the leading end of the second rib has a face in fluid communication with the valve flow passage; and
wherein the faces of the leading ends of the first and second ribs are parallel to one another and perpendicular to the central longitudinal axis of the inlet.

17. The valve of claim 16, wherein at least one of the top and bottom interior surfaces of the bowl is a radially interior surface.

18. The valve of claim 16, wherein the leading and trailing ends of at least one of the plurality of ribs have different heights.

19. The valve of claim 16, wherein at least one of the plurality of ribs intersects the central longitudinal axis of the inlet.

20. The valve of claim 16, wherein each of the first and second ribs is coupled to the orifice body.

* * * * *